March 1, 1955     A. R. CONSTANTINE     2,703,347
SEQUENCE CONTROL
Filed Aug. 3, 1953     3 Sheets-Sheet 1
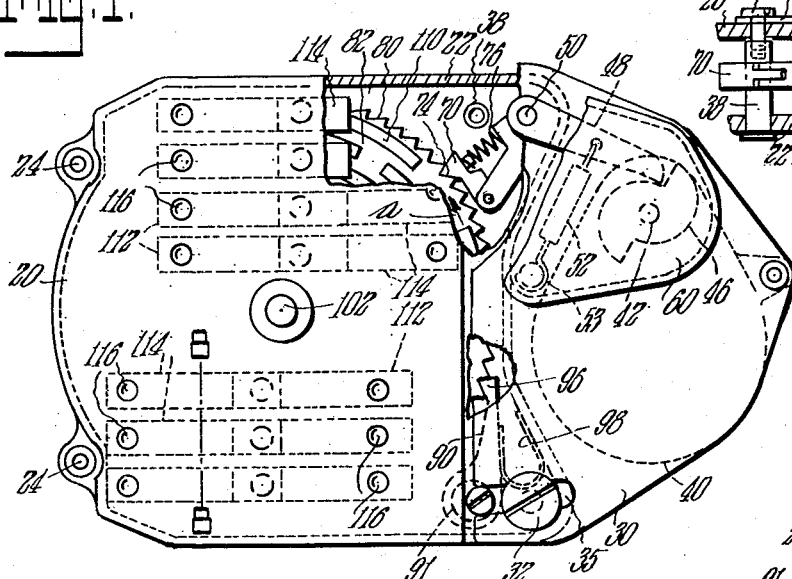
Fig. 1.
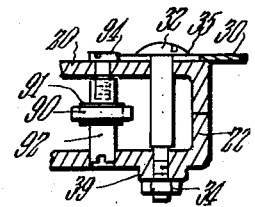
Fig. 3.
Fig. 4.
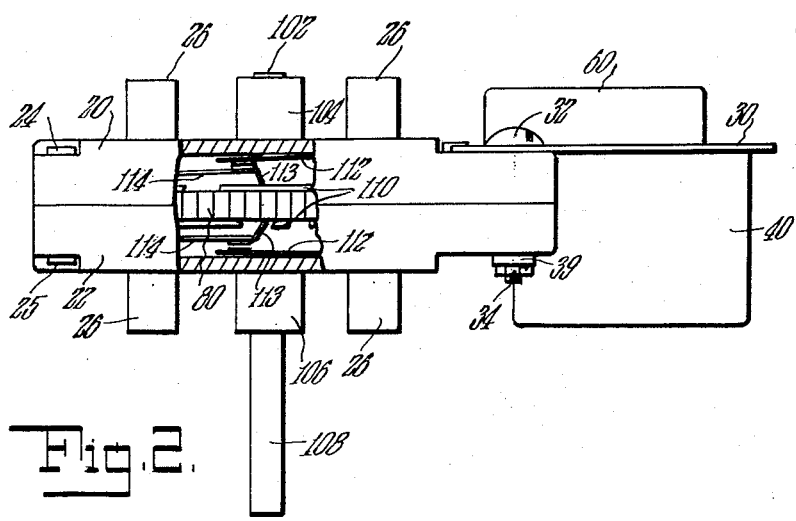
Fig. 2.
INVENTOR
Arthur R. Constantine.
BY Ross + Ross
Attys & Agent March 1, 1955  A. R. CONSTANTINE  2,703,347
SEQUENCE CONTROL
Filed Aug. 3, 1953  3 Sheets-Sheet 2
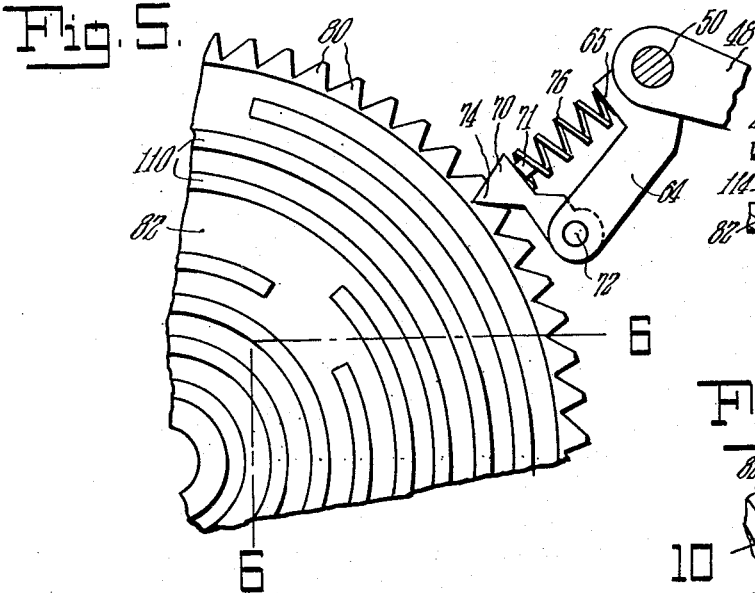
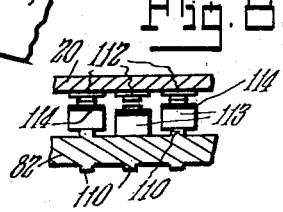
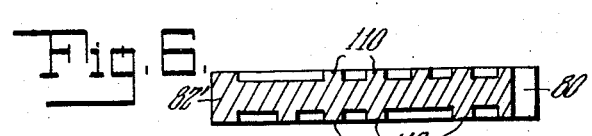
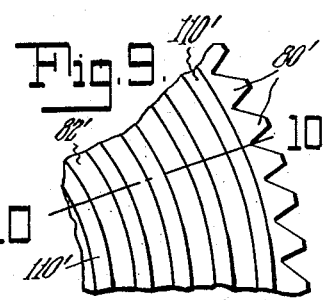
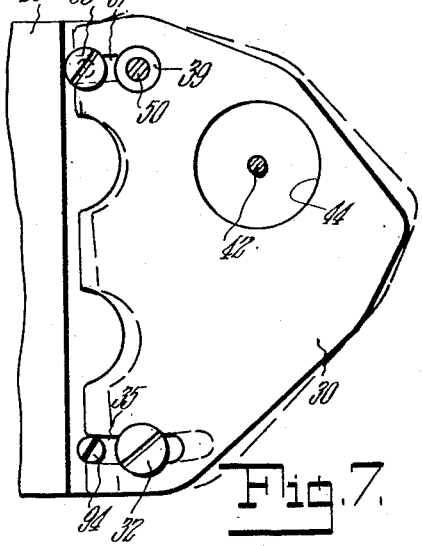
INVENTOR
Arthur R. Constantine.

March 1, 1955 — A. R. CONSTANTINE — 2,703,347
SEQUENCE CONTROL

Filed Aug. 3, 1953 — 3 Sheets-Sheet 3

INVENTOR.
Arthur R. Constantine.
BY

United States Patent Office 2,703,347
Patented Mar. 1, 1955

2,703,347

SEQUENCE CONTROL

Arthur R. Constantine, Longmeadow, Mass.

Application August 3, 1953, Serial No. 371,954

20 Claims. (Cl. 200—27)

This invention relates to new and useful improvements in controls for a sequence of operations and is directed more particularly to the provision of a mechanism for controlling a fixed series of operations in an assembly such as an automatic washing machine and machines of other types.

It is the principal object of the invention to provide a novel construction of the type wherein the working parts are more or less laterally disposed as to each other whereby a structure of relatively thin proportions is provided, making same especially applicable in situations where narrow space requirements are presented. Such a provision serves to eliminate the now present objectionable inconveniences where the space factor is such an all-controlling one.

This construction further offers the possibility of locating the structure at various angles relative to the device with which it is associated so as to best satisfy these limitations and specific requirements thereof.

In the preferred embodiment of the invention, interchangeable halves of the body or housing of the structure are used, whereby tooling costs are appreciably reduced. The end product is a device which is equally accessible from either side thereof.

The sides or halves of the structure being identical, the central support on which the timing cam rotates may be extended from either side, as may be desired, without any change of design being necessitated. As a result thereof, rotation of the timing cam from either side of the housing and in either direction, relative to the housing, may be readily attained.

Broadly speaking, the invention contemplates an automatic cyclic control switch of the type which is motor driven and which is provided with manual means for advancing the switch in order to shorten, or conceivably even eliminate, one or more of the periods of the cycle. It relates to a sequential controller for automatically controlled machines such as washing machines incorporating a device operated by a suitable electric motor and capable of delivering an intermittent or step-by-step forward motion from a source of constant rotary motion.

The improvements specifically relate to electric switch mechanisms in which a plurality of rotary switch actuating members are combined with a means for imparting an intermittent or step-by-step movement thereto.

One of the primary purposes of the invention is to provide structural and operational improvements in devices of the class to which reference has been made and to provide important distinct advantages in efficiency and the like over known prior art devices. It is still another object to provide an automatic electric switch mechanism in which the timing of a plurality of intermittently moving switch members may be conveniently effected. That is to say, the invention contemplates an apparatus for opening and closing a multiple of electrical circuits in a predetermined timed relation.

As a special feature of the invention, a device is provided in which the timing cam is actuated by a pawl engageable with the outer periphery thereof instead of being driven through the central support or shaft upon which the timing cam rotates, all to the end that intermediate drive gears, separate rotating shafts, and related components are eliminated.

With the above primary objects in view, it is another object to provide a cyclic timing mechanism of the above described character in which the number of operating parts is greatly reduced and which is simple and compact in accordance with the demands and desires of the purchasing public as well as of the manufacturers thereof and which is not only distinctive in its appearance and practical in its value but also reliable in its operation and efficient in its use.

To the above and other ends and with other objects of the invention as will become more readily apparent as the description proceeds, this invention consists in certain novel features of construction in a mode of operation and in the combination, organization and arrangement of parts as will be more particularly pointed out in the claims hereunto annexed and more fully described and referred to in conjunction with the accompanying drawings wherein:

Fig. 1 is a top plan view of the device of the invention with certain parts broken away for purposes of clarity;

Fig. 2 is a side elevational view of the device shown in Fig. 1;

Fig. 3 is a partial sectional elevational view on the axis of the cam follower shaft and the adjacent post member;

Fig. 4 is a partial sectional elevational view on the axis of the adjusting screw and the adjacent post member;

Fig. 5 is a partial plan view of the timing cam;

Fig. 6 is a sectional elevational view on the line 6—6 of Fig. 5;

Fig. 7 is a top plan view of the motor mounting plate;

Fig. 8 is an enlarged sectional elevational view on the line 8—8 of Fig. 1;

Fig. 9 is a partial plan view of a modified form of the timing cam shown in Fig. 5;

Fig. 10 is a sectional elevational view on the line 10—10 of Fig. 9;

Figure 11:
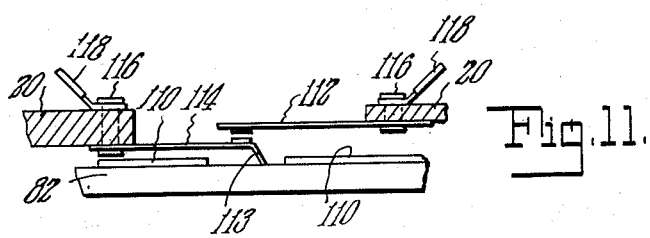
Fig. 11 is a sectional view taken along the timing cam and an adjacent pair of contact members.

In the above mentioned drawings annexed hereto and forming a part of this specification, I have shown several embodiments of my invention which are deemed preferable, but it is to be understood that other changes and modifications may be made in various respects and within the scope of the appended claims without departing from the broad aspects and spirit of the invention.

In the following description and claims, various details will be identified by specific names for convenience. These names, however, are intended to be as generic in their application as the art will permit.

Referring now to the drawings more in detail in which similar characters of reference indicate corresponding parts in the several figures and referring more particularly to the preferred form of the invention selected for illustrative purposes, I have shown a sequential controller which may be installed in operating position adjacent the casing of a machine such as a washing machine or the like with which it is operatively connected.

A two-part housing is comprised of a pair of similar half-shell members 20 and 22 which are made of a suitable insulating material and form a hollow supporting structure having spaced walls between which certain of the components of the invention are disposed. The members 20 and 22 are secured together as by screws 24 and nuts 25 which extend therethrough as shown. Rivets or similar means may be employed for the identical function.

It will be appreciated that a unitary single-piece housing with a cover or base member associated therewith or a segmented housing, assembled otherwise than as herein illustrated, could be employed with similar results.

Mounting bosses 26 may be provided which extend outwardly from the outer faces of the shell members for purposes of supporting the construction relative to the machine with which same is associated. With bosses extending from both sides of the housing, a wider range of choices of location of the structure is obviously permitted.

A motor mounting plate 30 is adjustably fixed to one of the shell members 20 by means of an adjusting screw 32 and nut 34. The screw 32 is receivable in a slot 35 of the member 30 and extends through the members 20 and 22. Additionally, a screw 36 is receivable in a slot 37 in the motor mounting plate 30 and through the shell member 20 and is threadedly engageable with a post 38 which is receivable through the shell member 22. Screws 32 and 36 may be adjusted so as to assist in retaining member 30 in the desired adjusted position relative to the housing.

A boss 39 is provided on the outer surface of each of the shell members 20 and 22. An opening is provided in the motor mounting plate 30 whereby the member 30 may be placed over and swung upon the boss 39, between positions such as shown in solid lines and in dash lines in Fig. 7. As aforesaid, the member 30 may be secured relative to the housing in the desired adjusted position by means of screws 32 and 36.

A motor 40 of a suitable type is secured to the plate 30 in any appropriate manner. It is provided with an output drive shaft 42 which extends upwardly through an opening 44 in the plate 30. The shaft 42 carries a motor cam 46 fixed to its free outer end, which cam may have any desired number of rising lobes so as to accomplish a predetermined motion, as will be observed.

The motor cam 46 engages and swings the free end of a cam follower 48 about a shaft 50 rotatable in the boss 39 and in the housing.

The cam follower 48 is held against the motor cam 46 by a cam follower spring 52 which is disposed between and is engageable with the cam follower 48 and a pin 53 carried by the motor mounting plate 30.

A pawl actuating lever 64 is fixed to and swingable on shaft 50 whereby members 48, 50 and 64 function as an integral bell crank.

The lever 64 carries an actuating pawl 70 which is fixed at one end thereof by means of a pin 72.

An actuating pawl spring 76 is disposed between a shoulder 65 of the member 64 and the pawl 70, nesting over a pin 71 projecting outwardly from the pawl 70, as best shown in Fig. 5. The spring 76 urges the actuating pawl 70 forwardly so that the free outer end 74 thereof bears against the ratchet teeth 80 on the peripheral edge of the timing cam 82.

As the cam follower 48 is released so as to be actuated by the spring 52, the actuating lever 64 and pawl 70 are simultaneously actuated so as to rotate the timing cam 82 forwardly in a step-by-step manner.

A detent pawl 90 is swingable on an eccentric 91 rotatably adjustable on a post 92 secured to the housing by means of a screw 94.

The finger 96 of the pawl 90 is engageable with the teeth of the timing cam 82 and is urged radially inward thereagainst by means of a detent pawl spring 98. The eccentric arrangement permits the ready adjustment of the pawl relative to the incremental movements of the timing cam whereby the pawl not only holds the timing cam in the exact position but also prevents any movement thereof during the return motion of the actuating pawl.

The back angle of the pawl 90 impinges on the face of the ratchet teeth 80 when dropping into position and prevents overtravel.

The timing cam 82 is mounted upon a timing cam shaft 102 extending therethrough and journaled in bearings 104 and 106 of the housing. It rotates in the direction of arrow $a$ in Fig. 1. The cam rotates in a counter-clockwise direction as viewed in Fig. 1.

It will be understood that the center around which the timing cam rotates may be rotating or stationary as desired, the shaft having no function in the actual operation of the timer. That is, the shaft can be fixed or keyed directly to the cam disc or the shaft can be stationary with the cam disc movable relative thereto, all as may be desired.

An outer extremity 108 of the shaft 102 extends outwardly and away from one side of the housing and upon which an indicating and a manual adjusting knob (not shown) may be carried. Conceivably, the knob could be directly connected to or integral with the timing cam itself, if desired. The knob would carry suitable indicia for indicating the various functions performed by the machine in the conventional manner.

The timing cam 82 is made of insulating material and is provided upon its opposite faces with a plurality of concentrically disposed radially spaced arcuate cam tracks 110. As many of these cam tracks may be provided as required for the particular operations needed.

Each cam track may have various length segments so as to provide the necessary "on" and "off" periods for the element or device controlled by that particular cam track.

In a modification shown in Figs. 9 and 10, teeth 80' are shown on a timing cam 82' and the outermost circular cam track 110' is shown to be disposed adjacent the teeth 80' rather than spaced inwardly therefrom, as shown in Figs. 5 and 6.

Pairs of resilient contact members 112 and 114 have outer ends secured to the inner walls of the shell members 20 and 22 and are electrically connected in circuits by means of rivets 116 to which connectors 118 in some form may be fixed.

The pairs of members 112 and 114 are arranged in substantial parallelism and tangentially relative to the concentrically disposed cam tracks of the timing cam whereby the free inner ends of the pairs of contact members are adapted for circuit closing engagement.

In each case, the cam tracks or segments thereof are so disposed as to permit the engaging and lifting of the inner end or finger 113 of a contact member 112 as the timing cam is rotated.

The dwells between the segments of the cam tracks provide depressions in which the fingers 113 of the contact members 114 remain, with the electrical circuit open, until moved upwardly by the related cam tracks as the timing cam is rotated. In each case, as a contact member 114 is urged upwardly, contact with the related contact member 112 is made, and its electrical circuit is thereby closed.

Figure 12:
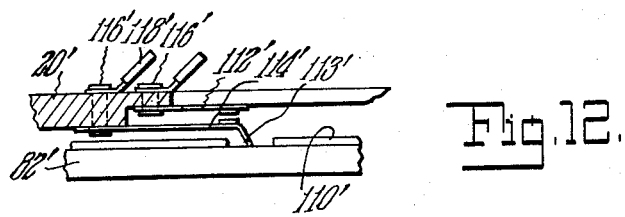
Figs. 12 and 13 are sectional views taken along the timing cam and an adjacent pair of contact members showing certain modifications of the invention.

A modification is shown in Fig. 12 wherein an optional method of mounting the switch contact blades is disclosed. Therein the cam tracks 110' are provided on the timing cam 82' in the aforedescribed manner. The contacts 112' and 114' are carried by the housing wall 20' as by rivets 116' to which connections 118' are secured. The member 112' is fixed to the wall of the housing member 20' and the member 114' is moved toward and away therefrom as the finger 113' rides on a cam 110' upon the rotation of the timing cam 82'.

Figure 13:
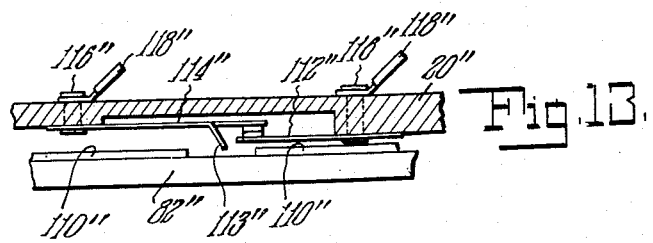

As a still further modification, in Fig. 13, I have disclosed an arrangement whereby the action of the contact arms is reversed from that shown in Fig. 11.

In Fig. 13, cams 110'' are provided upon timing cam 82'' and the contact members 112'' and 114'' are supported by the housing 20'' by means of rivets 116'' which are engageable with connections 118''.

In this modification, the members 112'' and 114'' are in normally closed relation as shown in Fig. 13 but as the finger 113'' rides upon a cam 110'' the contact is broken.

That is to say, in this form of the invention, the cam tracks serve to break the contacts between the contact members.

The structure of the invention having been described, its operation will now be explained.

The function of the motor cam 46 is to raise the cam follower 48 intermittently upon rotation thereof. As the motor cam continues its motion, the cam follower drops off the high point of the cam whereat the stored energy in the cam follower spring 52 causes the cam follower to swing rapidly in the opposite direction thereby moving the pawl actuating lever 64 connected integrally to it which in turn causes the actuating pawl 70 through its finger 74 to move the cam tooth 80 along a predetermined arc.

The detent pawl 90 holds the timing cam in position during the backward or return movement of the actuating pawl 70. The detent pawl 90, however, readily allows the greater force of the actuating pawl to urge the timing cam forwardly whereupon the detent pawl readily falls into the succeeding locking position.

To guarantee most reliable operation, it is desirable to have the interim rest position of the cam so located that the operating ends of the contact members are disposed a reasonable distance from the operating edges of the cam segments.

To provide means of obtaining this relationship, the pivotal mounting of the motor mounting plate around the boss 39 which serves as a fulcrum point is accomplished in order to permit the adjustment of the cam actuating pawl 70 so that upon the completion of the rapid forward motion, the cam 82 stops in the proper place.

When same is accomplished, it is necessary that detent pawl 90 be manually adjusted whereby the position of the pawl tip 96 is correctly positioned so as to lock the cam 82 securely and prevent any backward motion.

It will be appreciated that by the structure of this invention, the driving of the timing cam through a shaft is entirely eliminated whereby the objectionable features of back lash and the like are avoided. That is to say, the connecting links of this construction are all functional, no components being used for the drive mechanism only.

In the invention, development and construction of the timer of this invention, a guiding principle has been that the size thereof must be maintained at a minimum without the sacrifice of capacity. Hence, in the embodiment shown, there are provided a plurality (specifically seven) of concentric cam tracks on each side of the timing cam. To employ same satisfactorily and at the same time to continue to provide suitable clearances, the operating contact members have been divided between the two halves of each face of the timing cam and so mounted relative thereto that the rotation of the timing cam has a dragging effect on the inner ends of the operating contact members.

Furthermore, in the preferred embodiment the contact fingers rest upon alternate cam tracks on the timing cam. For example, the four contact members adjacent one side (or half as shown in Fig. 1) of the face of the timing cam contact cam tracks which, for the sake of illustration, may be numbered as cam tracks 1, 3, 5 and 7, while the contact members adjacent the other side (or half) of the face of the timing cam contact cam tracks which, again for purposes of illustration, may be numbered as cam tracks 2, 4 and 6.

This arrangement permits a maximum of cam surfaces to be incorporated into a minimum amount of space and at the same time provides the necessary clearances laterally between the contact members.

It will be understood that one or more of the pairs of contact members may be in operational contact at any given moment.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A multiple switch mechanism for use with a plurality of circuits comprising, a housing, a two sided flat circular program cam with ratchet teeth on the periphery thereof, a laterally disposed driving motor with an operating shaft equipped with a motor cam having a gradual rise and a precipitant fall and a spring loaded bell-crank lever having one of the pair of arms thereof actuated by the motor cam and the other of the pair of arms having a spring held actuating pawl in contact with the ratchet teeth of said program cam, the actuating pawl of said crank lever being retracted over one ratchet tooth upon the rise of said motor cam followed by the rapid forward inching of said program cam through a predetermined arc during the precipitant fall of said motor cam.

2. The device of claim 1 including a plurality of pairs of electric switches disposed within said housing adjacent said program cam and adapted for connection in circuits and each being opened and closed for a predetermined time duration by the rotation of said program cam.

3. The device of claim 1 including a detent pawl for preventing forward or backward movement of said program cam.

4. The device of claim 1 including means for adjusting said motor relative to said housing causing said actuating pawl to be proportionately adjusted and establishing the fixed position of said program cam between intermittent movements thereof.

5. A multiple switch mechanism for use with a plurality of circuits comprising, a housing, a disc-like rotatable timing cam within said housing and having on each of its cam faces a plurality of radially spaced circular cam tracks, a plurality of pairs of electric switches disposed within said housing toward said timing cam and adapted for connection in circuits and each being opened and closed for a predetermined timed duration by the rotation of said timing cam, a motor fixed to said housing and having a shaft rotatable on an axis spaced radially of the axis of rotation of said timing cam, and a spring loading and releasing device operated by said motor and laterally disposed relative to said timing cam for coacting therewith to advance said timing cam in a step-by-step manner.

6. Apparatus for opening and closing multiple electrical circuits in predetermined timed relation comprising, a support, a cam disc rotatable on a vertical axis and having a cam face rotated thereby in a horizontal plane, a plurality of contact members secured to said support over said cam face, another plurality of contact members secured at one end to said support and having free ends engageable with the first named contact members, the contact face of said cam disc including a plurality of concentrically related tracks arranged to engage the free ends of the second named contact members, said cam disc being provided with peripherally spaced teeth, a motor mounted on said support having a shaft rotatable on an axis spaced radially of the axis of rotation of said cam disc, and operating means actuated by said motor engaging the teeth of said cam disc for rotating said cam disc in a step-by-step manner.

7. A multiple switch mechanism for controlling the opening and closing of a plurality of circuits at predetermined time intervals and in predetermined sequence comprising, a rotatable disc-like sequence controlling cam having a plurality of concentrically disposed radially spaced cam tracks in a common plane on each of the opposite sides thereof and having ratchet teeth on the outer periphery thereof, contacts arranged for connecting in circuits and opened and closed by the rotation of said sequence controlling cam, a motor disposed offset relative to said cam, and a spring loading and releasing device operated by said motor and coacting with the ratchet teeth of said cam for advancing said cam in predetermined increments.

8. A multiple switch mechanism for use with a plurality of circuits comprising in combination, a disc-like rotatable timing cam having on each of its opposite faces a plurality of axially spaced circular cam tracks, a plurality of switches adapted for connection in circuits, and means positionable on said timing cam and operative to engage and operate said switches in synchronism with time through a predetermined course of rotary movement of said cam.

9. A multiple switch mechanism for controlling the opening and closing of a plurality of circuits in predetermined sequence and at timed intervals comprising in combination, a housing carrying a plurality of contacts arranged for connecting in circuits and adapted to be opened and closed, a sequence cam for opening and closing the contacts upon rotation thereof, said sequence cam being provided with peripherally spaced teeth, a motor, a spring loading and releasing device associated with said motor, and a bell crank for rotating said cam in a step-by-step manner upon the unloading of said spring device.

10. Apparatus for opening and closing multiple electrical circuits in predetermined timed relation comprising, a housing, a disc rotatable on a vertical axis within and relative to said housing, said disc having a cam face rotatable in a horizontal plane and being provided with a plurality of concentrically disposed radially spaced cam tracks, pairs of superposed resilient contact members having outer ends secured to said housing and having inner free ends independently movably in vertical planes, said cam tracks being adapted for lifting and holding and releasing one contact of each of said pairs in contact with the other contact of each of said pairs, and operating means for rotating said disc in a step-by-step manner for successively actuating said pairs of contacts.

11. Apparatus for opening and closing circuits as set forth in claim 10 wherein said pairs of contacts are arranged in parallelism and tangentially relative to the cam tracks of said disc.

12. Apparatus for successively opening and closing a plurality of electrical circuits comprising in combination, a supporting structure having relatively spaced walls, a disc rotatable between said walls and having opposite faces spaced inwardly of inner sides of said walls, pairs of resilient contacts having outer ends secured to inner sides of said walls with the contacts of the pairs thereof in alignment and the free inner ends thereof being in superposed normally spaced engageable relation, said disc provided on opposite faces thereof with radially spaced concentrically disposed zones having outer faces for engaging and lifting inner ends of one contact of each of said pairs into contact with the other contacts of each of the pairs thereof and the faces of said zones being provided with circumferentially spaced relatively depressed dwells in which the inner ends of the said one contacts are receivable for disengagement of the contacts of said pairs, said discs being provided with teeth around the periphery thereof, actuating means for said disc including a pawl pivotally mounted on said supporting structure for engaging said teeth and rotating said disc in a step-by-step manner in one direction and operating means for swinging said pawl.

13. The apparatus of claim 12 including a dog means for engaging the teeth of said disc to hold said disc against rotation in an opposite direction.

14. Apparatus for opening and closing circuits as set forth in claim 10 wherein said operating means includes ratchet teeth provided on the outer periphery of said disc and a bell crank engageable with the ratchet teeth and intermittently actuated by an elecrically driven mechanism.

15. Apparatus for successively opening and closing a plurality of electrical circuits comprising in combination, a supporting structure, a timing cam rotatable on a vertical axis within said supporting structure, pairs of aligned contacts having outer ends secured to said supporting structure and inner ends thereof in superposed normally spaced engageable relation, said timing cam being provided with radially spaced concentrically disposed cam tracks having outer faces for engaging and lifting inner ends of one of the contacts of said pairs into contact with the other of the contacts of said pairs and with circumferentially spaced relatively depressed dwells in which inner ends of the said one contact of said pairs are receivable for the disengagement of the contacts of said pairs, said timing cam being also provided with peripherally spaced teeth including operating means and a power train spaced laterally of said timing cam a bell crank pivotally mounted on said supporting structure for engaging the teeth of said timing cam and rotating same in a step-by-step manner.

16. Apparatus for opening and closing circuits as set forth in claim 15 wherein said pairs of contacts are disposed in substantially parallelism tangentially of the cam tracks.

17. Apparatus for opening and closing circuits as set forth in claim 15 wherein said operating means includes an electric motor for actuating the bell crank.

18. Apparatus for the opening and closing of multiple electrical circuits in predetermined timed relation comprising, a housing, a program cam rotatable within and relative to said housing, pairs of superposed resilient contact members having outer ends secured to said housing and arranged for connection in electrical circuits and having inner free ends adapted for circuit closing engagement, said program cam being provided with a plurality of concentrically disposed radially spaced cam tracks for said pairs of contact members, said cam tracks being provided with faces for lifting and holding one contact of each of said pairs out of contact with the other contact of each of said pairs and provided with intermediate dwells in which one contact of each of said pairs is receivable in contacting relation with the other contact of each of said pairs, and operating means for rotating said timing cam in a step-by-step manner for successively actuating said pairs of contacts.

19. The device of claim 18 including operating means comprising, a motor, an actuating cam operated by said motor, a bell crank disposed between said actuating cam and said program cam for periodically rotating said program cam.

20. A timing device for closing and opening electrical circuits comprising in combination, a support, a cam disc rotatable relative to the support on a vertical axis and having a cam face rotatable in a horizonatl plane on rotation of said cam disc, said cam disc having peripheral teeth, a drive motor, operative connections between said drive motor and teeth arranged to rotate said cam disc in a certain direction and in a step-by-step manner, said support having a portion adjacent and spaced from the cam face of said cam disc, a plurality of first contacts carried by the said portion of said support for connecting in circuits, a plurality of elongated second contacts having inner ends fixed to said support and yieldable outer free end portions extending from the said inner ends generally in the direction of rotation of said cam disc adapted to engage said first contacts, and the cam face provided with radially spaced concentrically disposed tracks having portions to independently engage the free ends of the second contacts for contact thereof with the first contacts.

References Cited in the file of this patent

UNITED STATES PATENTS

| | | |
|---|---|---|
| 2,201,798 | Scott et al. | May 21, 1940 |
| 2,210,299 | Kuttes | Aug. 6, 1940 |
| 2,288,783 | Brownshield | July 7, 1942 |
| 2,639,340 | Gaite | May 19, 1953 |
| 2,656,424 | Frerer et al. | Oct. 20, 1953 |